March 1, 1966 W. M. WILLIS 3,237,888
AIRCRAFT

Filed Sept. 18, 1962 4 Sheets-Sheet 1

WILLIAM M. WILLIS
INVENTOR.

BY
AGENT

March 1, 1966

W. M. WILLIS 3,237,888

AIRCRAFT

Filed Sept. 18, 1962

INVENTOR.
WILLIAM M. WILLIS
BY

AGENT

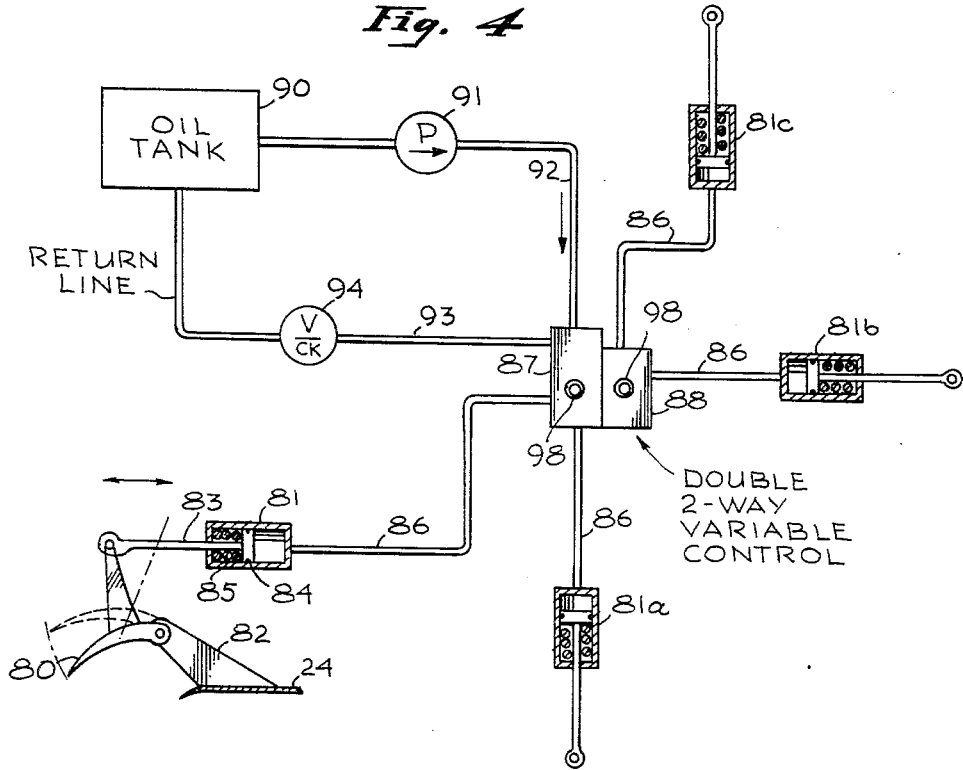

March 1, 1966 W. M. WILLIS 3,237,888
AIRCRAFT
Filed Sept. 18, 1962 4 Sheets-Sheet 4

INVENTOR.
WILLIAM M. WILLIS
BY
AGENT

United States Patent Office 3,237,888
Patented Mar. 1, 1966

3,237,888
AIRCRAFT
William M. Willis, Northridge, Calif., assignor to Cosmologistics Corp., Northridge, Calif., a corporation of California
Filed Sept. 18, 1962, Ser. No. 224,293
3 Claims. (Cl. 244—23)

The present invention finds particular utility in the field of aircraft and relates particularly to vertical takeoff and landing type aircraft and, further, relates to hovering type aircraft adapted also for forward, reverse and lateral movements.

The aircraft of this invention is an improvement on and incorporates lift and propulsion principles similar to those set forth in Patent Number 2,990,137, issued June 27, 1961, and entitled Aircraft and Lift-Propulsion Means Therefor by the common inventor.

There has long been continued activity relating to the invention and development of many different types of aircraft employing a large variety of lift and propulsion systems. Additionally, many contemporary investigators and designers of such machinery have produced designs, built and tested aircraft for a large variety of purposes. Additionally, many attempts have been made with varying degrees of success to design, construct and operate small so-called personal type aircraft based upon known principles of operation and including new propulsion methods as these became known in the arts. It has been found generally that lift and propulsion methods and apparatus suitable for one size and type of aircraft may not be suitable for other sizes and types thereof with considerable contemporary effort being made in an extremely crowded field toward arrival at an optimum type design and construction to provide advantages of all known lift and propulsion methods when incorporated in vertical takeoff and landing type machines of varying sizes and load capacities.

Vertical takeoff and landing (VTOL) types of aircraft have taken the form of heavily powered conventional devices utilizing propellers, reaction type engines and combinations of these still further associated with ducted fans and apparatus employing displaceable axis lift and propulsion units. Additionally, various lighter-than-air structures have been used and proposed to accomplish similar ends.

In all of these prior devices, the relative efficiencies thereof as related to power requirements and necessary weight and complexity of control structures, have provided serious limitations on production of such aircraft inasmuch as the mere size and complexity necessarily dictated high cost thereof. Additionally, inasmuch as such prior structures have been relatively inefficient, fuel requirements have been high, landing and takeoff areas restricted and storage or special landing facilities had to be provided. Still further, these prior structures have required a highly trained pilot for operation thereof, inasmuch as the stability and control problems were ever present.

In other instances, matters of safety relating to operators of such aircraft and ground personnel or individuals who may casually be in an area of takeoff or landing have been considered and certain compromises had to be recognized in view of problems relating to rotating elements such as propellers or blades and exhaust from reaction type engines. These prior types have taken the form of helicopters employing single or multiple rotors, convertible types of vehicles, as well as the ducted fan arrangements. It is, therefore, desirable in such types of aircraft to avoid the use of exposed rotating propellers or blades and to minimize the effects of heated exhaust gases in reaction type devices.

It is accordingly one important object of the present invention to provide a VTOL type aircraft employing improved lift and propulsion propellers.

It is another object of the invention to provide a VTOL type aircraft having lift and propulsion mechanisms of high efficiency and enabling use of relatively inexpensive and small types of power plants.

It is still another object of the invention to provide an aircraft employing a turbine driven ducted fan arrangement together with an improved lifting principle enabling incorporation of such principles in relatively small as well as conventionally large types of aircraft.

It is a further important object of the invention to provide a VTOL aircraft including a novel lift and propulsion mechanism wherein high velocity air flow is established and maintained over a relatively stationary surface, means being provided to direct such air flow in close proximity to such surface.

A still further important object of the invention is to provide a VTOL type aircraft including novel means for containing a flow of high velocity air over a surface and in such close proximity to the surface as to create a reduction in static or atmospheric pressure therealong and a resultant component of force resulting from a differential pressure over atmospheric pressure which may thereafter be used for lift and control of the aircraft.

Another object of the invention is to provide a VTOL aircraft having a novel control means associated and operable in conjunction with improved lift and propulsion principles.

A still further object of the invention is to provide a VTOL type aircraft that is relatively simple in design, extremely efficient in operation, reliable in use and relatively inexpensive in manufacture.

Another object of the invention is to provide an improved aircraft mechanism of the VTOL type and including lift and propulsion means therefor wherein such aircraft presents a relatively low silhouette, is comparatively simple to operate, has improved stability and control characteristics enabling accurate maneuverability and hoverability and which is of such a size and weight as to enable a high load to weight ratio, transportation to a point of use, storage, and like necessary activities.

In accordance with one aspect of the present invention, the VTOL type aircraft hereof includes a power plant which may be of the turbine variety that is utilized to drive one or more ducted fans. The fans serve to provide a controlled flow of air over one or more surfaces whereby to produce a high velocity air flow over such surfaces to reduce the static pressure therealong below ambient atmospheric pressure. Disposition of such surfaces facing in an upwardly direction serves to provide a vertical component of force on the aircraft. Further, in accordance with the invention, means are provided for directing and/or containing the high velocity flow of air along and in close proximity to the described surfaces, such containing means being of a nature whereby to be nonpressure supporting in a vertical direction, or at 90° to the lift rector.

In accordance with a further aspect of the invention, power absorption means is provided as one manner of control of the operating speed and associated air flow volume whereby to control air flow over the described surfaces and the level of a directional motive component produced thereby. This type of control is also associated with further types of directional controls whereby to provide maneuverability of the aircraft in all directions and with no regard for immediately prior directions of movement.

In accordance with still another aspect of the invention, a plurality of surfaces are serially arranged in a manner more efficient to utilize the air flow derived from the rotating fan or fans and to enable provision of substantial lifting forces within a relatively small and compact VTOL type aircraft.

Other and further important objects and advantages and aspects of the invention will become apparent from the disclosures in the following detail specification, appended claims and accompanying drawings wherein:

FIG. 4 is a diagrammatic hydromechanical diagram showing a typical form of control for the present aircraft;

FIG. 5 is a diagrammatic representation of a typical two-way variable control valve which may be used in conjunction with diagrammatic control arrangement of FIG. 4;

FIG. 6 is a transverse sectional view through the valve of FIG. 5 as taken substantially as indicated by line 6—6, FIG. 5;

Figure 1:
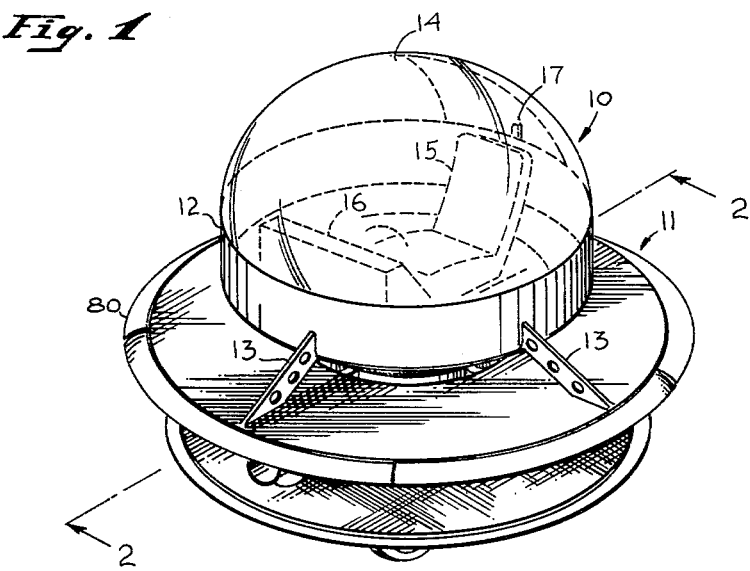
FIGURE 1 is a general perspective view of the VTOL aircraft of the present invention.

With reference to the drawings and with reference primarily to FIG. 1, the VTOL aircraft of the present invention includes a passenger compartment indicated generally at 10 and mounted in conjunction with a lifting control and propulsion portion 11 of the aircraft. While the passenger compartment 10 may take various forms the aircraft of the present invention is shown as including a relatively small compartment that is adapted primarily for a single individual. For this purpose inclosure 10 includes a cylindrical frame portion 12 that is supported by means of a plurality of struts 13 to the upper surface of the lift and propulsion portion 11. The inclosure may also be provided with a suitable dome 14 in which a conventional seat 15 and controls 16 are located. The dome may further be provided with a hatch 17 with a suitable ladder or collapsible step mechanism 18 being mounted on one of the struts 13 to enable entry to the hatch 17. If desired, the step mechanism 18 may be associated with the hatch 17 and pivotally supported as at 20 to permit stowage thereof.

Figure 3:
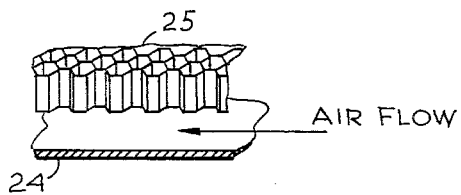
FIG. 3 is an enlarged fragmentary sectional perspective view showing details of a lifting surface and air flow confinement means associated therewith.

The propulsion portion 11 comprises generally upper and lower annular passage structures 21 and 22, respectively, each of which have inner peripheral ends connected to an annular passage 23. The passage structures 21 and 22 are disposed normal to and in communication respectively with upper and lower ends of the passage 23, an axis of the passage 23 being disposed vertically with respect to a normal attitude of the aircraft. The passage structure 21 includes a disk-like member 24 defining a lower wall thereof, an upper wall of the passage structure 21 being defined by a non-pressure supporting element or non-force element in assisting or retarding lift, indicated generally at 25. The element 25 is also disk-like and is maintained in space relationship to the member 24 or 22 as by ribs 26 adjacent an outer peripheral area thereof, an inner peripheral area being connected to a curved transition portion 27 intermediate the passage structure 23 and the passage structure 21. The wall 25 may be composed of any suitable material which will serve to protect a flow of high velocity air along the wall 24 while not of and by itself supporting pressure for the purpose of protecting the air stream from being disturbed or diffused by outside gust of air or the raw air in flight. Such a material may be as indicated at FIG. 3 wherein the wall 25 is shown as comprising a honeycomb structure having the plurality of openings therein positioned substantially normal to an upwardly directed surface of the wall 24. The wall 25 may also comprise a porous medium of the type disclosed in the before-mentioned Patent Number 2,990,137. The passage structure 22 is similar to the passage structure 21 and includes an annular lower wall 28 and a non-pressure supporting upper wall 30 that is maintained in space relation to the wall 28 as by a plurality of radially extending struts 31. In other words, the element 30, defined as being non-pressure supporting, is of a nature whereby to support no forces that are disposed to act parallel to the direction of lift as produced on the upwardly directed surfaces of the walls 24 and 28 by the flow of air thereover. In this connection, it is to be understood that this non-pressure supporting wall 30 also serves in the nature of a means to provide the before-mentioned protection of the high velocity air flow along the upper surfaces of the walls 24 and 28, and in the absence of external gusts of air and the like which may tend to disturb the flow of air along these surfaces such protecting structure is not needed. However, the present specific example of the aircraft is described in a manner to include such protecting structures inasmuch as most anticipated and present uses of this type of aircraft encounter flight problems wherein these protecting structures are desirable.

The passage structures 21 and 22 together with the passage structure 23 serve to define an air flow path which has an annular entrance as at 32 intermediate with the peripheral ends of the lower wall 28 and non-pressure supporting wall 30. The air flow path is indicated by the arrows 33 and has a discharge intermediate the outer annular peripheral ends of the lower wall 24 and the non-pressure supporting wall 25 as indicated at 34. The effect of high velocity air flowing along the path defined by the arrows 33 will be hereinafter described in detail.

The propulsion portion 11 is supported with respect to other components of the aircraft by means of brackets 35 which are connected to an inner annular surface portion 36 at the passage structure 33 and adjacent upper lower ends thereof. The brackets 36 serve also to support a pair of accessory housing members 37 and 38, the purpose of which will be hereinafter more fully described. Also, depended from an upper surface of the housing member 37 a pillar element 40 serves to provide a support intermediate the propulsion portion 11 and the frame portion 12, this pillar element 40 cooperating with the struts 13 to provide an adequate support for the frame portion 12 comprising a portion of the pilot's compartment.

The propulsion portion 11 further includes an engine indicated generally at 50 which for purposes of the present invention may be a gas turbine motor having a compressor and turbine section indicated generally at 51 and an accessory section indicated generally at 52. High velocity heated gases developed by the motor 50 and delivered therefrom into an annular scroll 53 which is positioned about and in radially spaced relationship to an outer annular surface element 54 of the passage structure 23. The hot gases are adapted to flow from the scroll 53 through a plurality of turbine blades 55 carried by the outer peripheral portion of a pair of rotors 56 and 57. The rotors 56 and 57 are carried respectively on shafts 58 and 60 which are in turn journaled in suitable bearings 61 in the upper and lower housing structure 37 and 38. Each of the rotors 56 and 57 have a hub portion 62 having an outer peripheral portion 63 that is spaced radially inwardly from an outer annular ring 64. The radially juxtaposed surfaces of the rotor portions 63 and the rings 64 are generally contiguous with the inner and outer annular surfaces of the surface elements 36 and 54 defining the passage structure 23. The portion 63 and the rings 64 are maintained in their spaced relationship by means of a plurality of generally radially extending fan blades 65. The rings 64 serve further to support the turbine blades 55 that are suitably shrouded by means of the scroll 53, the ring 64 being suitably contoured to define a radially outwardly directed surface along which the hot high velocity gases may flow and pass over the blades 55 and into a scroll 66. The blades 55 on each of the rotors 56 and 57 are contoured in a reverse fashion relative to each other whereby to effect counter rotation of the rotors 56 and 57. The blades 65 on each of the rotors 56 and 57 are also pitched in opposite directions whereby to induce a flow of air along the path defined by the arrows 33 in the direction of the arrows 33. The hot gases leaving the scroll 66 are adapted to flow into an expansion chamber 67 of a tail pipe assembly, indicated generally at 68 and outwardly through a tail pipe 70 through an adjustable nozzle structure 71. As shown, the engine 50 as well as the tail pipe assembly 68 are supported relative to other components of the propulsion portion 11 as by suitable struts 72 and 73.

It may thus be seen that a high velocity flow of air is induced through the passage structures 21, 22 and 23 along the path defined by the arrows 33 by means of the counter rotating fan blades 65. This high velocity air flows along and is defined with respect to the upper surfaces of walls 24 and 28 by means of the non-pressure supporting walls 25 and 30, respectively. A pressure differential is, therefore, developed across each of the walls 24 and 28, respectively, atmospheric pressure acting upon downwardly directed surfaces thereof and lower than atmospheric pressure acting upon the downwardly directed surfaces thereof, whereby to produce a vertical component of force which may serve to lift the aircraft in a vertical direction. Such an effect is commonly known as a Coanda effect, this effect defining a well known principle wherein a stream of high velocity air will follow a surface contour and at various velocity gradients creating a lower than atmospheric pressure, giving what amounts to a lift component at the surface. It has been found that structures of the type set forth in this invention will produce a pressure differential ratio lower than atmospheric of from 1.01 to 2.7 dependent on velocity, e.g. at Mach .6 velocity a ratio of 1.23 is created. Accordingly, the primary function of the honeycomb walls 25 and 30 is to protect the flow of high velocity air over the upper surfaces of walls 24 and 28, respectively, whereby to create the desired lifting force. In this connection, it is also well known that the static pressure existing at a surface is dependent upon the velocity of the air flowing over the surface. A relatively constant velocity gradient is maintained over the upper surfaces of walls 24 and 28 by a proper proportioning of the vertical distances between the walls 24 and 28 and the non-pressure supporting walls 25 and 30 in a radial direction. In other words, all areas of the passage structures 21 and 22 are substantially the same in a radial direction whereby to maintain a relatively constant velocity of air flow over the upper surfaces of the walls 24 and 28. This maintenance of constant velocity over the surfaces is of substantial importance and is accomplished by the particular structural arrangement of the aircraft lift and propulsion portion of the present invention.

As one specific example relating to a particular version of the present invention that has been constructed and successfully tested, a structure was employed for test purposes that utilized a fan having a diameter of 2.98" and a hub of 1.40". Air flow created by this fan amounted to 46 c.f.m. with a velocity in the area of Mach .12. The pressure ratio created at Mach .12 was equal to 1.013. In this particular instance, and neglecting any back pressure normally encountered in passages, and further considering a lift surface having a 10" diameter, a total lift component on one such surface was found to be equal to 3.6 pounds of lift force. In this particular instance, the power required for this particular test arrangement was .0014 H.P. It may thus be seen that these relationships in sizes and forces may be proportionally changed in a manner to provide substantially equivalent forces and lifting characteristics of a full size aircraft.

The amount, volume and velocity of air passing through the passage structures 21, 22 and 23 may be controlled in an accurate manner by means of a power absorption device, such as a hydraulic pump or dynamometer 74 that is carried by and depended from each of the housing structures 37 and 38. Outer ends of the shafts 58 and 60 may be connected to a suitable gear 75 which in turn drive gears 76 and 77, the gear 76 being carried by a shaft that is operably connected to the power absorption unit 74. The gear 77 is carried by a shaft that is operatively associated with an accessory element, as for example a generator indicated at 78. Additional accessories, such as oil pumps, generators, fuel pumps, and the like, as needed in connection with the engine 50 may be provided in the accessory package 52 carried and driven by the engine 50.

Inasmuch as the method of obtaining vertical lift has been described herein, forward and lateral movement of the present aircraft may be accomplished by means of suitable controls including plurality of vanes 80 that are pivotally carried by an outer peripheral edge of the non-pressure supporting wall 25. The vanes 80 are positioned in groups at various locations disposed approximately 45° from each other and are selectively actuated by means of any suitable actuating device, such as indicated at 81 and which may be a hydraulic, pneumatic or electric type actuator carried by a bracket 82 that is attached to an outwardly peripheral portion of the passage structure 21. The actuators 81 have output shafts 83 connected to the vanes 80. The vanes 80 are also positioned with respect to air flowing outwardly from the periphery of the passage structure 21 whereby to deflect such air flow and produce a force movement in a direction to tilt the aircraft about its central vertical axis. Upon such tilting, a resultant force created by the lifting action of the air flow along the path of the arrows 33 will have a component that is lateral to the vertical axis of the aircraft whereby to produce lateral movement thereof in any desired direction or to provide stability for the aircraft when in ambient wind conditions.

In other words, the vane 80 may be considered a complete circumferential turning vane by which the air exhausted from over the upper surface of the wall 24 will be deflected downwardly thus creating a lifting force by ram air effect and the change in the directional flow thereof. These vanes also serve as both a pitch and yaw control means or may be used in conjunction with rotatable sections in the form of a stabilizing ring or vane which may be adapted for radial outward turning to adjust the amount of ram effect in a manner similar to that employed in connection with thrust spoilers. Through such structure complete stabilization of the aircraft is made possible. In order that adequate control of the craft may be achieved, it has been found that five or more movable vanes 80 about the periphery of the propulsion portion 11 comprise a suitable number; however, it is to be understood that more or less such vanes may be employed without departing from the spirit and scope of the invention.

With reference primarily to FIG. 4, the vanes 80 may be controlled by any suitable mechanism common and well known in the art of aircraft control surface movement. In FIG. 4, a suitable control arrangement is illustrated diagramatically and is shown as including a plurality of actuators 81, 81-a, 81-b and 81-c. Each of these actuators are in the form of hydraulic piston arrangements, each having a piston 84 connected to the output shaft 83 and forming a movable wall one side of which engages a compression spring 85, the other side of which is subjected to hydraulic fluid under pressure delivered thereto by way of suitable conduits 86 from a pair of two-way valves indicated at 87 and 88. The two-way valves 87 and 88 are supplied with oil under pressure from a suitable tank 90 as by a pump 91 and through a conduit 92. The oil under pressure is returned by way of a conduit 93 to the tank 90, there being a check valve 94 disposed in the conduit 93. The two-way valves 87 and 88 are in the form of control valves, one arrangement for which is illustrated in FIGS. 5 and 6. For purposes of illustration, the valve 87 is diagramatically shown and includes a body 95 in which a valve element 96 is disposed. The valve element is connected to an operating shaft 97 that is both rotatable and linearly movable by means of an operating handle or stick 98 that is pivotally connected thereto as at 100. The handle 98 has an integral leg portion 101 which bears against a transverse end 102 of the valve body 95. A compression spring 103 is disposed between the valve element 96 and an inner surface of the transverse end 102. An inlet for oil under pressure is provided to the interior of the body 95 as at 104 and is delivered to a side of the valve member 96 remote from the spring 103. A return for the oil under pressure is provided as at 105. The valve body 96 has a pair of semicircular recesses 106 and 107 in the periphery thereof and laterally opposite one another, the recess 106 having an open longitudinal end toward a chamber 108 communicating with the inlet 104 and the recess 107 having a longitudinal end open into a chamber 110 communicating with the return port 105. A pair of outflow connections 111 and 112 are provided in the body 95 and respectively communicate with the recesses 106 and 107. While in FIG. 5 the recesses 106 and 107 are shown diagrammatically opposite each other for illustrative purposes, these recesses are positioned in a manner to control flow to and from a pair of the hydraulic cylinders 81, as for example cylinders 81-c and 81-b. Upon rotation of the handle 98, communication is selectively provided to one of these hydraulic cylinders with return flow from the other. Upon movement of the handle 98 in a direction pivotally about the pivot 100, a proportional flow of fluid may be accomplished in these conduits by partial occlusion of the ports 111 and 112 by a peripheral edge surface of the valve member 96. The described valve 87 is typical with the valve 88 operating in a similar manner.

Figure 7:
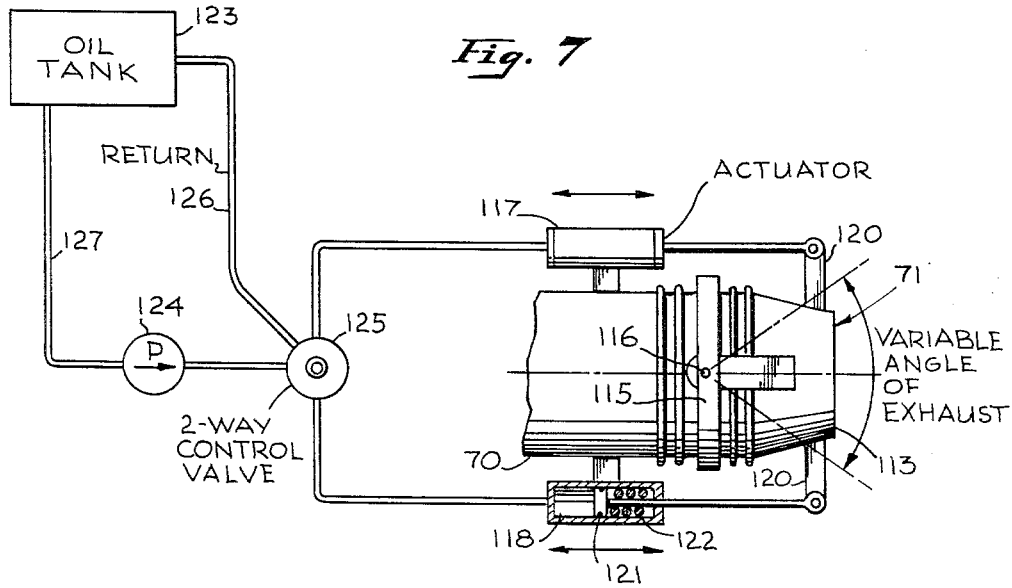
FIG. 7 is a partially diagrammatic illustration representing a gimbal nozzle control for the reaction engine of the present aircraft.

Normal forward motion of the aircraft may be achieved through action of the exhaust gases being ejected from the tail pipe assembly 68. As indicated hereinbefore, the tail pipe assembly is provided with the tail pipe 70 and the adjustable nozzle 71. The adjustable nozzle is schematically illustrated in FIG. 7 and includes an exhaust gas exit structure which may be suitably controlled to direct the exhaust gases as desired. The nozzle exit structure includes a cone arrangement 113 that is pivotally connected to a gimbal structure 115 as at 116. The gimbal structure is carried by the tail pipe 70. The position of the cone 113 is determined by action of a pair of actuators 117 and 118 positioned on lateral sides thereof and carried by the outer surface of the tail pipe 70 as by struts 119. The actuators 117 and 118 have output shafts peripherally connected to brackets 120 on each lateral side of the cone 113. The actuators 117 and 118 are typically illustrated as at 118 and each includes a piston 121 that is biased in one direction by means of a spring 122 and movable in another direction by hydraulic fluid under pressure delivered from a suitable tank 123 by means of a pump 124 through a two-way control valve 125. Excess fluid may be returned to the tank 123 by means of a conduit 126 with the fluid delivered from the tank passing through a conduit 127 to the pump 124 and two-way valve 125. The two-way valve may be of a type illustrated in FIG. 5.

Thus, the direction of the reactive forces created by the exhaust thrust through the nozzle 71 and cone 113 may be suitably controlled.

It will be understood that the various controls, including the two-way valves 87, 88 and 125, may be suitably arranged in the passenger or pilot's compartment and that interconnecting lines may be provided as desired. It is also to be understood that the pumps, as for example those indicated at 91 and 124, may be suitably driven by direct connection to the gears driven from the shafts 58 and 60 or by electrical power source, such as a battery (not shown) supplied by the generators 78. It is also to be noted that the cone arrangement 113 serves as an anti-rotation control for the aircraft as may be desired in particular instances or as a means for orienting the craft for movement in a particular direction.

Figure 2:
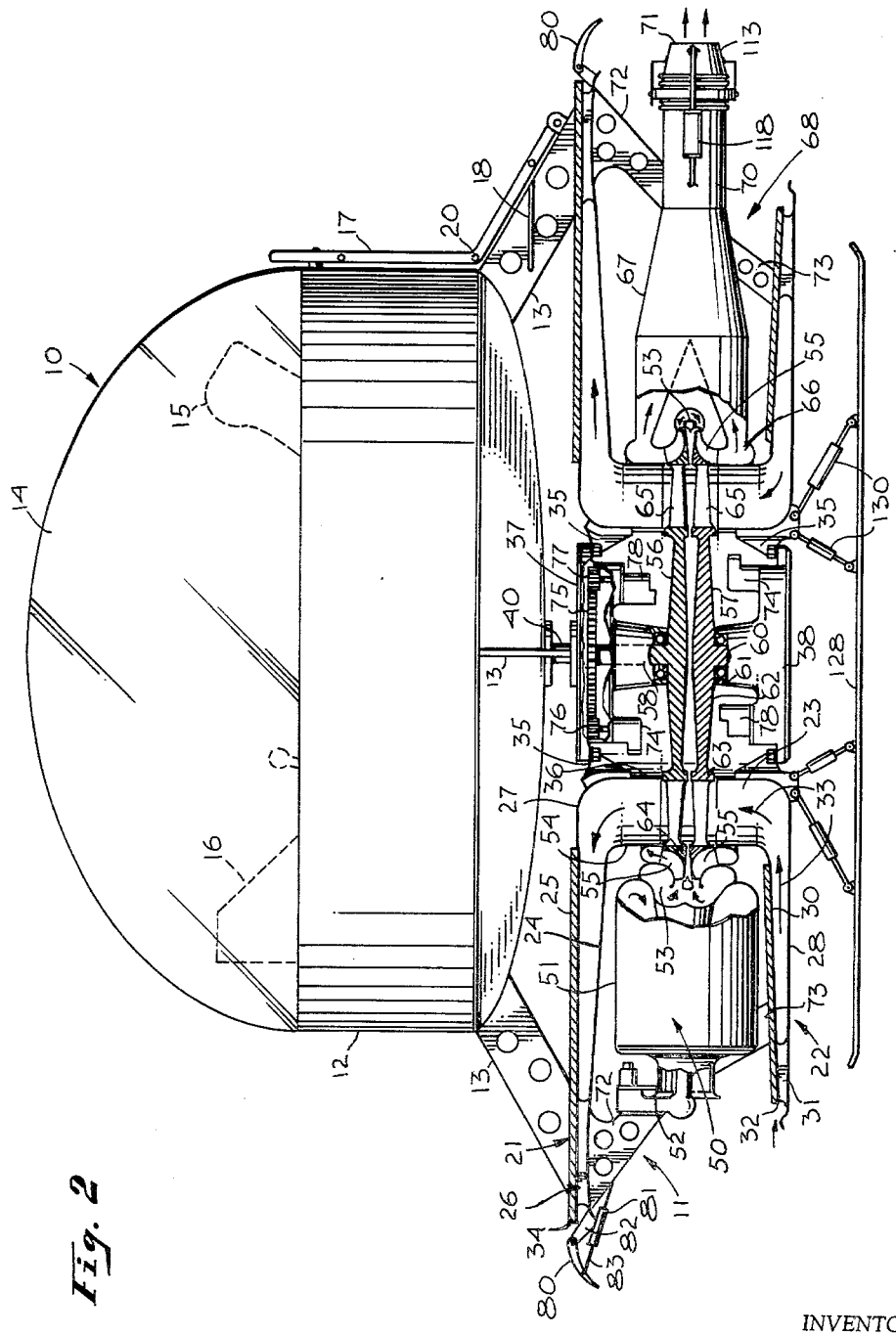
FIG. 2 is a side elevational view partially in section of the aircraft and taken substantially as indicated by line 2—2, FIG. 1.

Referring primarily to FIG. 2, the aircraft of this invention is also provided with suitable landing gear which may comprise wheel structures or, as shown, may comprise skid arrangements as at 128 and supported in connection with the brackets 35 as by suitable struts 130. It is to be understood that while skids are shown and described in connection with the present aircraft, other types of landing structures may be employed without departing from the spirit and scope of the invention.

Figure 8:
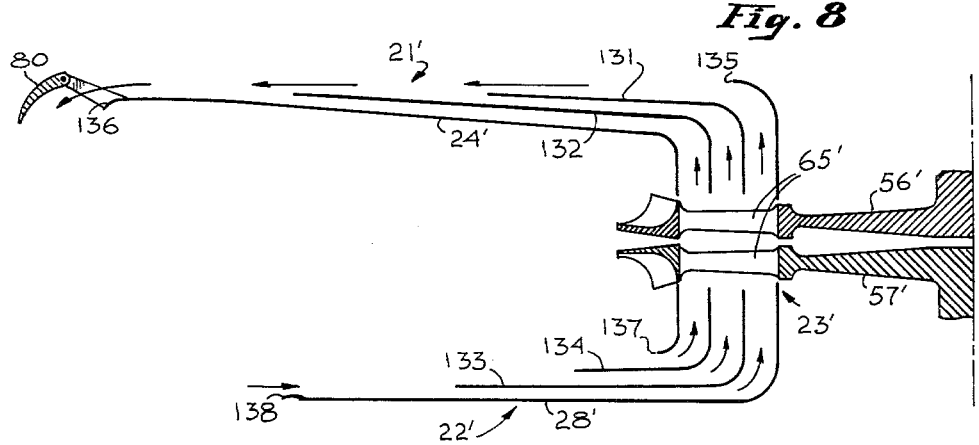
FIG. 8 is a fragmentary sectional view showing a modified means for maintaining high velocity air flow over lifting surfaces.

With reference primarily to FIG. 8, a modified form of the invention is illustrated wherein means are provided for inducing a pressure differential across walls indicated generally at 24' and 28'. In this form of the invention, the passage structure 21' and passage structure 22' are connected as described hereinabove to a passage structure indicated generally at 23'. Additionally, rotors 56' and 57' support suitable blades 65' within the passage structure 23 whereby to induce a flow of air through the passage structures. It may be seen that a pair of annular vane members 131 and 132 are positioned within the passage structure 21' and a pair of annular vane members 133 and 134 are positioned within the passage structure 22'. Inner peripheral ends of the vane members 132, 133 and 134 are suitably curved and disposed within the passage structure 23 having terminal ends positioned adjacent the fan blades 65'. It may be seen that the outer peripheral edges of the vane elements 131 and 132 are radially spaced from an outer peripheral end 135 of the upper portion of the passage structure 23 and from an outer peripheral edge 136 of the surface element 24'. Additionally, it may be seen that the outer peripheral edges of the vane members 133 and 134 are spaced radially from a radial edge 137 of the passage structure 23' and an outer radial edge 138 of the wall 28'. This particular arrangement obviates the necessity for use of a non-pressure supporting element to confine the flow of high velocity air over the lifting surfaces. Inasmuch as short radial areas are presented intermediate the outer radial edges of the passage structure 23, vane members 131, 132, 133 and 134, the flow of air will be adequately directed over the surfaces immediately radially outwardly from each of the outer peripheral edges of these elements. Accordingly, exposed portions of each of the elements as well as the upper surfaces of the walls 24' and 28' serve as the passage walls across which a pressure differential is developed to provide the desired lifting force. The particular advantage of providing the turning vanes 131, 132, 133 and 134 resides in the fact that such vanes provide constricting passages of peripherally increasing diameters to produce the desired efficiency. In this connection it will be recognized that the air flowing over the vanes and outwardly from peripheral ends thereof will tend to diffuse in a radially outwardly expanding cone pattern which may result in a positive pressure on a lifting surface unless suitably controlled thereover. The movable passages thus provided by the turning vanes therefore prevent such conical diffusion to provide a lift producing stucture which requires less power to accomplish a given radial length of high velocity air flow. In other words, a single passage requires a substantially greater amount of power to maintain a high velocity flow pattern with separation from the surface over which it is deployed or conical diffusion thereof.

Figure 9:
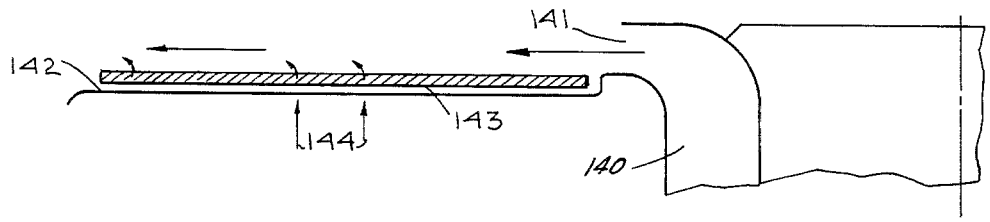
FIG. 9 is an illustration of an alternative arrangement for creating a pressure differential across a surface.
Figure 10:
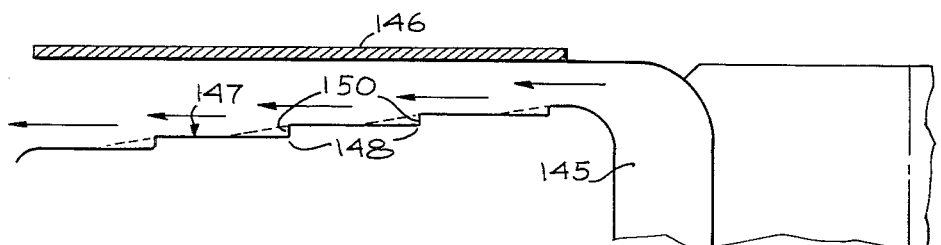
FIG. 10 is a view similar to FIG. 9 illustrating a further modified arrangement for creating lift acrosss a particularly contoured surface.

With reference to FIGS. 9 and 10, alternative arrangements are diagramatically illustrated which may be used in conjunction with the present aircraft to provide the desired vertical lifting forces by high velocity flow of air over or through particular structures. These alternate arrangements are illustrated in the diagrammatic manner and may obviously be structurally combined with the mechanisms illustrated primarily in FIGS. 2 and 8. In the form of the invention illustrated in FIG. 9, a high velocity flow of air is delivered by way of a passage 140 to an exit therefrom as at 141. A lifting surface 142 is provided and stepped downwardly from a lowermost surface of the passage 140. Within the stepped portion a suitable cellular structure 143 is positioned, having openings disposed substantially normal to the surface 142. The structure 143 may be similar to the honeycomb arrangement illustrated in FIG. 3 and has an uppermost surface that is contiguous with the lower surface of the passage 140. Accordingly, high velocity air flowing from the exit 141 of the passage 140 is directed over the upper surface of the structure 143, thus by aspiration creating a reduction in pressure on the surface 142 below that of atmospheric pressure which acts in an upwardly direction as indicated by the arrows 144. As shown, this reduction in pressure is possible inasmuch as the area through the multiple passages of the structure 143 is extremely large compared to the area intermediate outermost edges of the structure and the surface 142.

With reference to FIG. 10, this form of the invention includes a high velocity air flow passage 145, there being a suitable honeycomb structure 146 disposed contiguous with an upper extremity of the passage 145. In this form of the invention a skirt or radially extending element indicated generally at 147 is disposed radially outwardly from the lowermost surface of the passage 145 and is provided with a plurality of annular steps as at 148. Accordingly, as the high velocity air flows over each of the steps 148, a plurality of low pressure bands are developed as at 150 in conjunction with each of the steps, thus to provide an overall pressure differential across the member 147 and a vertical lifting component of force.

It may thus be seen that other types of construction may be employed to confine a high velocity flow of air along a surface of a passage wall whereby to create a force component in one direction to provide lift and/or propulsion to an aircraft vehicle.

In accordance with the foregoing, it may be seen that an aircraft device has been provided wherein objects and advantages set forth hereinbefore are accomplished and problems related to prior types of VTOL type aircraft are avoided.

Having thus described the invention and the present embodiments thereof, it is desired to emphasize the fact that many further modifications may be resorted to in a manner limited only by a just interpretation of the following claims.

I claim:
1. In an aircraft, the combination of:
a frame structure;
a pair of generally horizontally disposed annular wall members carried by said frame structure and having upwardly directed surfaces defining a pair of lifting surfaces and downwardly directed surfaces;
an annular continuous passage pneumatically interconnecting radially inner portions of said lifting surfaces;
means for inducing a high velocity flow of air over only and in close proximity to a first of said lifting surfaces, through said passage and thereafter over only and in close proximity to a second of said lifting surfaces to produce a pressure differential across said wall members, said pressure differential resulting from ambient atmospheric pressure acting upon said downwardly directed surfaces of said wall members and a pressure lower than atmospheric pressure acting upon said upwardly directed surfaces of said wall members; and
means carried by said frame structure for driving said air flow inducing means.

2. An aircraft according to claim 1 wherein said horizontally disposed wall members are annular disks having a common axis and disposed substantially parallel to each other.

3. An aircraft according to claim 1 wherein each of said upwardly directed surfaces of said wall members is provided with a flow confining and protecting means positioned adjacent and substantially parallel to said upwardly directed surfaces, said confining and protecting means being honeycomb panels each having an area substantially equivalent to an area of one of said upwardly directed surfaces and having unrestricted openings therein positioned substantially normal to said upwardly directed surfaces.

References Cited by the Examiner
UNITED STATES PATENTS

| | | | |
|---|---|---|---|
| 1,907,160 | 5/1933 | Schauman | 244—23 |
| 2,151,687 | 3/1939 | Campbell | 170—135.75 |
| 2,419,443 | 4/1947 | Eaton. | |
| 2,468,787 | 5/1949 | Sharpe | 244—12 X |
| 2,609,068 | 9/1952 | Pajak. | |
| 2,843,339 | 7/1958 | Streib | 244—12 |
| 2,959,377 | 11/1960 | Kaplan | 244—40 |
| 2,973,166 | 2/1961 | Stahmer | 244—23 |
| 2,978,206 | 4/1961 | Johnson | 244—23 |
| 2,990,137 | 6/1961 | Willis | 244—12 |
| 3,041,830 | 7/1962 | Thomas et al. | 244—23 X |
| 3,073,551 | 1/1963 | Bowersox | 244—23 |

FOREIGN PATENTS

| | | |
|---|---|---|
| 393,086 | 10/1908 | France. |
| 129,142 | 7/1919 | Great Britain. |

MILTON BUCHLER, *Primary Examiner.*
FERGUS S. MIDDLETON, *Examiner.*